March 17, 1936. W. ESCH 2,034,510
GUIDE FOR FLEXIBLE CONDUITS
Filed May 4, 1933
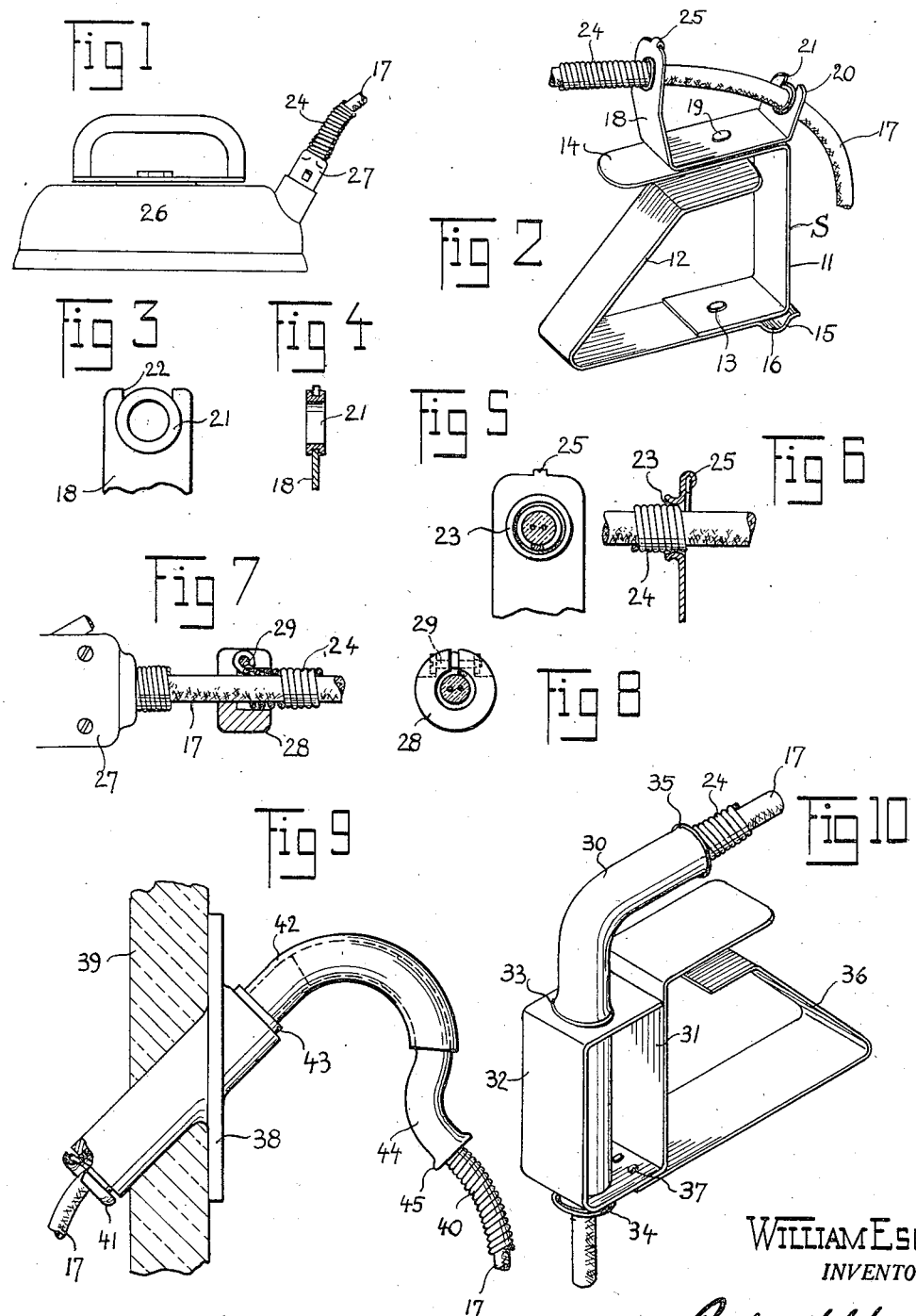
WILLIAM ESCH
INVENTOR.
ATTORNEYS.

Patented Mar. 17, 1936

2,034,510

UNITED STATES PATENT OFFICE 2,034,510

GUIDE FOR FLEXIBLE CONDUITS

William Esch, New York, N. Y.

Application May 4, 1933, Serial No. 669,408

4 Claims. (Cl. 248—51)

This invention concerns a guide for flexible conduits, electric cords, cables or hose for instance, serving to supply electricity to a device or apparatus which is being moved about.

One object of this invention is to provide a guide which may be suitably arranged at any point intermediate to the source of supply of the electricity or gas and the apparatus in which they are to be used, and from which the conduit is paid out to any length and in any direction desired, as the device or the apparatus is being moved about.

Another object of this invention is to pay out a conduit from a fixed point to any desired length or in any direction.

Another object of this invention is to provide a guide from which a conduit is paid out to a movable apparatus or device, said guide serving to retain the conduit substantially straight, so that it does not become entangled, unduly bent or kinked, is not subjected to excess wear and tear, and does not inconvenience the user.

These and other objects of this invention will be more fully understood from the following description and from the exemplary showings of the appending drawing in which:

Fig. 1 shows the end of my guide attached to an electric iron.

Fig. 2 shows the other end of my guide in connection with supporting means in a perspective view.

Fig. 3 shows an end view of a bushing used in connection with my device.

Fig. 4 shows a corresponding cross-sectional side view.

Fig. 5 shows in a sectioned end view the manner in which my guide is fastened to a bracket.

Fig. 6 shows a corresponding cross-sectioned side view.

Fig. 7 shows in a partly sectioned side view a modified manner of attaching my guide to an electric cord.

Fig. 8 shows a corresponding end view.

Fig. 9 shows in a sectioned elevation another modification of my device attached to a wall.

Fig. 10 illustrates a modification of the device of Fig. 2.

Similar numerals refer to similar parts throughout the various views.

In Fig. 2 I show a metal stamping 11 to which is attached a suitably shaped flat spring 12 by being riveted or welded thereonto at 13. This support S, which comprises parts 11, 12 and 13, may be suitably clamped onto a table or board like an ironing board, the top part 14 of the stamping being slid over the edge of the board onto the top thereof; the spring 12 then clampedly retains the supports on the board.

A clamp 15 forms the rear of the flat spring 12; it is offset, so that a loop 16 is provided adjacent to the support S. This clamp serves to support the wire or electric cord 17 at a convenient point intermediate to where the cord is connected to a source of current and where it passes through the bracket 18 of this device. When, said cord is inserted between the support S and the clamp 15 it is clampedly retained at that point.

Upon the top part 14 of the support S the swivel bracket 18 is fulcrumed upon a pin, rivet or screw 19. The swivel bracket 18 is spaced for a short distance from said top part by a suitably struck hub or by a washer, shoulder or collar (not shown).

The swivel bracket 18 is angularly bent and the two ends thereof slidably support the cord 17. Such a slidable support is exemplarily provided at the rear end 20 of the bracket by means of an ear 21, which is clamped into a slot 22 in said end of the bracket (Figs. 3 and 4). Near the other end of the bracket 18 a hole is provided for, which is surrounded by a flare. The flare 23 supports a coiled spring 24; by engaging upon one or more convolutions thereof, and the free end of the coiled spring is engaged underneath a struck back tongue 25 extending from the bracket. This exemplary method of fixedly attaching the ends of the coiled spring 24 upon the swivel bracket is exemplarily illustrated in Figs. 5 and 6. Of course, a variety of ways of mounting the spring upon the swivel bracket suggest themselves by those acquainted with the art.

The cord or conduit 17 freely slidably extends from the swivel bracket, through the spring 24 the end of which is supported on said bracket, to the device or apparatus fed by way thereof, for instance the electric iron 26 of Fig. 1. The other end of the coiled spring 24 may either be attached to the iron 26 or connecting plug 27, through which the electric cord 17 issues onto the iron 26 as illustrated in Fig. 1, or the said spring may be attached to the cord 17 at a point removed for a certain distance from the plug 27, as illustrated in Figs. 7 and 8. In other words the conduit extending between the swivel bracket and the portable device may be covered wholly or partly by the elongatable sleeve or spring 24.

A way of fastening the end of the spring on the conduit is suggested in Figs. 7 and 8 where a split collar 28 is clamped onto the cord 17 at any desired point by means of the screw 29, which extends across the gap of the slot of the collar. The collar 28 is countersunk in order to accommodate the end of coiled spring 24; the end of the coiled spring is looped into the shape of an eye, which is hooked over the screw 29.

If the support S is clamped onto an ironing board, and the iron 26 is moved in different directions over the ironing board during the use thereof, the spring 24, which represents an elongatable sleeve, is extended or collapsed as the iron is moved away from or towards the bracket 11. The cord 17 slides back and forth in the extended or collapsed coiled spring, sliding back and forth in the ear 21, from which it dangles loosely; the cord 17 may be attached underneath the clamp 15 at a point from which a certain play is allowed for the cord to be pulled through the bracket during the movements of the electric iron. As the electric iron 26 is moved about in various directions in respect to the support S, the swivel bracket 18 swings around its fulcrum 19 so that the spring always extends straight from the bracket in the direction of the iron, substantially radial in respect to the fulcrum 19. For this purpose the point at which the spring issues from the bracket 18, i. e., the flare 23 of Fig. 2, is laterally offset in respect to fulcrum 19.

The bracket 18 of Fig. 2 may take the shape of sweep fittings, for instance the L-shaped tubing 30 of Fig. 10. In this case the bracket 31 may be looped back upon itself, forming a rectangular part 32. Suitable openings in the top and in the bottom of the rectangle 32 rotatably retain the bracket 30. The bracket 30 may be flared out at 33, just above the rectangular part 32, so that it is thrustwise supported on the top of the rectangular part. The lower end of the tube 30 is flared out and the end of spring 24 is engaged underneath the flared end of the tube in bead fashion, at 34. The elongatable spring 24 extends in this case through the bracket or tube 30 so that it is partly accommodated therein. It may even be so short, that when collapsed it is completely accommodated in the tube and the device attached to the other end of the electric cord 17 then rests against the upper opening 35 of the tube when not in use. Of course the spring 24 may be also attached to the other end 35 of the tube in the same manner of the arrangement of Fig. 2.

The flat spring 36, which corresponds to the flat spring 12 of Fig. 2, is fastened upon the bottom of the rectangular parts of the support 31 (rivets 37). The support may assume the shape of a simple flange, when the guide of my invention is to be permanently fixed to a floor, wall or any other stationary object. Such a flange is indicated in Fig. 9 at 38, said flange being mounted upon a wall 39. In back of the wall the wire 17 dangles down and slidably extends in the other direction through the coiled spring 40 which is fastened upon the base 41 at the lower end of the bent tube 42. The bent tube 42 is journalled in the bracket support 38, and is endwise retained thereon by means of a collar 43. Between the bent tube 42 and the coiled spring 40 slidably extends a horn 44, the curved end of which extends along a circle concentric to the bend of tube 42. The horn 44 can therefore slide to a limited extent into or out of the tube 42, as the wire 17 extends from the cord at a greater or lesser incline. The end 45 of the tube is preferably disposed radially to the center around which the horn 44 slides in the tube 42, in the manner of telescoping tubes. In this manner I provide a universal joint at the fixed end of my guide in respect to which the movable device or apparatus may be moved in all directions and at all angles.

By those who are acquainted with this art, it is readily understood that the telescoping of the horn in the tube may also be applied to the elongatable sleeve which is shown in the drawings exemplarily as a coiled spring. Thus the end 45 of the tube may be slightly longer in a straight radial direction and accommodate one or more telescoping tubes which are fastened on the extreme other end to the conduit or to the device or apparatus the conduit leads to.

Such application may be particularly useful where it is not desirable to use a metal spring, and where expenses of making the spring in non-metallic material would be too great. I here have particular reference to highly inductive currents, high frequency currents for instance, as used in electro-therapy, in which instance an elongatable sleeve executed in metal would not be practical. Longitudinally elongatable sleeves or tubes have also been executed in fabrics in which an elastic (rubber for instance) warp extends longitudinally off the tubes and is interwoven with a spirally disposed woof made of resilient material like hair. Such a fabric tube is well adapted for the elongatable sleeve of my invention.

Although I have shown and described few forms of embodiment of my invention in detail, yet I do not wish to be limited thereby, except as the state of the art and the appended claims may require, for it is obvious that various modifications and changes may be made in the forms of embodiment of my inventions, without departing from the spirit and scope thereof.

What I claim is:—

1. A guide comprising a flexible conduit, a support, an angular fitting accommodating said conduit, one arm of said angular fitting being journalled in said support, and an elongatable sleeve issuing from the other end of said fitting and slidably accommodating said conduit, a point of a part of said sleeve issuing from said fitting being longitudinally fixed relatively to said conduit.

2. A guide comprising a flexible conduit, a support, an angularly shaped tube accommodating said conduit, one arm of said angularly shaped tube being journalled in said support, and an elongatable sleeve issuing from the other end of said tube and slidably accommodating said conduit, a point of a part of said sleeve issuing from said tube being longitudinally fixed relatively to said conduit.

3. In combination with a conduit, a support, a first tube rotatably mounted on said support, a second tube hinged at one end upon said first tube and forming a continuation thereof, an elongatable sleeve extendable from the other end of said second tube, said conduit extending through said tubes and said sleeve and being longitudinally fixed relatively to a point of the part of said sleeve which is extended from said second tube.

4. In combination with a conduit, a support, a first tube rotatably mounted on said support, an arcuate portion in said first tube, a second tube longitudinally slidably connected at one end with said arcuate portion of said first tube and forming a continuation thereof, an elongatable sleeve extendable from the other end of said second tube, said conduit extending through said tubes and sleeve and being longitudinally fixed relatively to a point of the part of said sleeve which is extended from said second tube.

WILLIAM ESCH.